US011950583B2

(12) United States Patent
Hyun

(10) Patent No.: US 11,950,583 B2
(45) Date of Patent: Apr. 9, 2024

(54) FISHING REEL

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 17/966,615

(22) Filed: Oct. 14, 2022

(65) Prior Publication Data
US 2023/0135182 A1 May 4, 2023

(30) Foreign Application Priority Data

Oct. 29, 2021 (KR) .................. 10-2021-0146420

(51) Int. Cl.
*A01K 89/01* (2006.01)
*A01K 89/0155* (2006.01)
*A01K 89/033* (2006.01)

(52) U.S. Cl.
CPC ...... *A01K 89/01555* (2013.01); *A01K 89/033* (2013.01)

(58) Field of Classification Search
CPC .............................................. A01K 89/01555
See application file for complete search history.

(56) References Cited

U.S. PATENT DOCUMENTS

| 4,544,111 A * | 10/1985 | Nakajima | A01K 89/01555 242/291 |
| 4,561,605 A * | 12/1985 | Nakajima | A01K 89/01555 310/105 |
| 9,854,791 B2 * | 1/2018 | Toake | A01K 89/01555 |
| 2016/0037759 A1 * | 2/2016 | Ikebukuro | A01K 89/01555 242/288 |
| 2016/0235048 A1 * | 8/2016 | Ikebukuro | A01K 89/01555 |

FOREIGN PATENT DOCUMENTS

| KR | 200144800 | 2/1999 |
| KR | 20120112132 | 10/2012 |
| KR | 20120133584 | 12/2012 |
| KR | 20150006698 | 1/2015 |

* cited by examiner

*Primary Examiner* — Emmanuel M Marcelo
(74) *Attorney, Agent, or Firm* — CANTOR COLBURN LLP

(57) ABSTRACT

Provided is a fishing reel having a magnet disposed in a circumferential direction crossing the axial direction of a spool and, more particularly, a fishing reel that can increase a braking force control range even without an increase in size and can maximize a casting distance by preventing backlash and preventing reduction of a casting distance due to a braking force by using a magnet brake. The fishing reel includes a spool having a drum on which a fishing line is wound, and a magnet brake including a holder disposed on a side of the spool and a magnet mounted on the holder in a circumferential direction crossing an axial direction of the spool to have inner and outer facing surfaces and generating a braking force to the spool.

5 Claims, 12 Drawing Sheets

FISHING REEL

BACKGROUND OF THE INVENTION

Field of the Invention

The present disclosure relates to a fishing reel having a magnet disposed in a circumferential direction crossing the axial direction of a spool and, more particularly, to a fishing reel that can increase a braking force control range even without an increase in size and can maximize a casting distance by preventing backlash and preventing reduction of a casting distance due to a braking force by using a magnet brake.

Description of the Related Art

In general, when casting with a casting reel, the rotational speed of a spool from which a fishing line is released is larger than a flying speed of a lure, so the flying distance of the lure is short or the fishing line is entangled, which is called backlash.

In order to prevent such backlash, a fishing reel, in a broad meaning, employs a friction brake that uses physical friction and a magnet brake that uses attraction of magnetism.

The magnet brake of these brakes, which is a non-contact type brake unlike the friction brake, reduces the rotational speed of a spool by applying attraction of magnetism to the rotating spool using the magnetism of a plurality of magnet brakes disposed on a reel body.

According to magnet brakes of the related art, a ring type plate is mounted on a side of a spool and a plurality of magnets is circularly arranged on a side spaced apart from the plate such that the magnets and the plate face each other, so when the spool is rotated at a high speed, the magnetism of the magnets acts on the plate and generates a braking force, thereby preventing backlash.

Such magnet brakes of the related art are configured to control the braking force by adjusting a gap by moving a holder, on which magnets are mounted, in the axial direction of a spool.

However, since such magnet brakes of the related art are configured to adjust a fine gap between magnets and a plate disposed to face each other, the braking force control range is unavoidably small, and accordingly, when the movement distance of a holder is increased to increase the braking force control range, there is a problem that the body of a fishing reel is correspondingly increased in size.

Further, since the braking force of magnet brakes of the related art is fixed regardless of the rotation speed of a spool, a braking force over a predetermined level keeps being generated even though a spool is rotated at a low speed, so there is a problem that a casting distance decreases, etc.

For reference, as relevant technologies in the related art, there are Korean Patent Application Publication No. 10-2015-0006698, Korean Utility Model No. 20-0144800, Korean Patent Application Publication No. 10-2012-0112132, Korean Patent Application Publication No. 10-2012-0133584, etc.

SUMMARY OF THE INVENTION

The present disclosure has been made in an effort to solve the problems described above and an objective of the present disclosure is to provide a fishing reel that can increase a braking force control range even without an increase in size and can maximize a casting distance by preventing backlash and preventing reduction of a casting distance due to a braking force by using a magnet brake. In order to achieve the objectives of the present disclosure, a fishing reel according to the present disclosure includes: a spool having a drum on which a fishing line is wound; and a magnet brake including a holder disposed on a side of the spool and a magnet mounted on the holder in a circumferential direction crossing an axial direction of the spool to have inner and outer facing surfaces and generating a braking force to the spool.

Further, in the fishing reel according to the present disclosure, the spool may include a facing part extending in the axial direction of the spool from an end of the drum to face one of the inner and outer facing surfaces of the magnet, and receiving magnetism of the magnet.

Further, in the fishing reel according to the present disclosure, the holder may be moved forward and backward in the axial direction of the spool, so a braking force may be controlled in accordance with variation of a facing area between the magnet and the facing part.

Further, in the fishing reel according to the present disclosure, the magnet may have an outer diameter smaller than an inner diameter of the facing part, so magnetism may act on an inner circumferential surface of the facing part.

Further, in the fishing reel according to the present disclosure, the holder may include a mount, in which the magnet is fitted, and a fixing plate detachably coupled to the holder while covering an opening of the mount and configured to fix the magnet.

According to the fishing reel of the present disclosure, since the magnet that generates a braking force to the spool is mounted in a circumferential direction crossing an axial direction of the spool to have inner and outer facing surfaces, the magnet brake and the facing part of the spool can be disposed to overlap each other without being spaced apart from each other to the left and right, so the left-right movement distance of the magnet brake is maximally secured, and accordingly, it is possible to secure a braking force control range as wide as possible even without increasing the size of the fishing reel.

In particular, since a braking force is increased or decreased in accordance with the rotation speed of the spool with the braking force initially set, there is an effect that it is possible to effectively suppress backlash and prevent reduction of a casting distance.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1A:
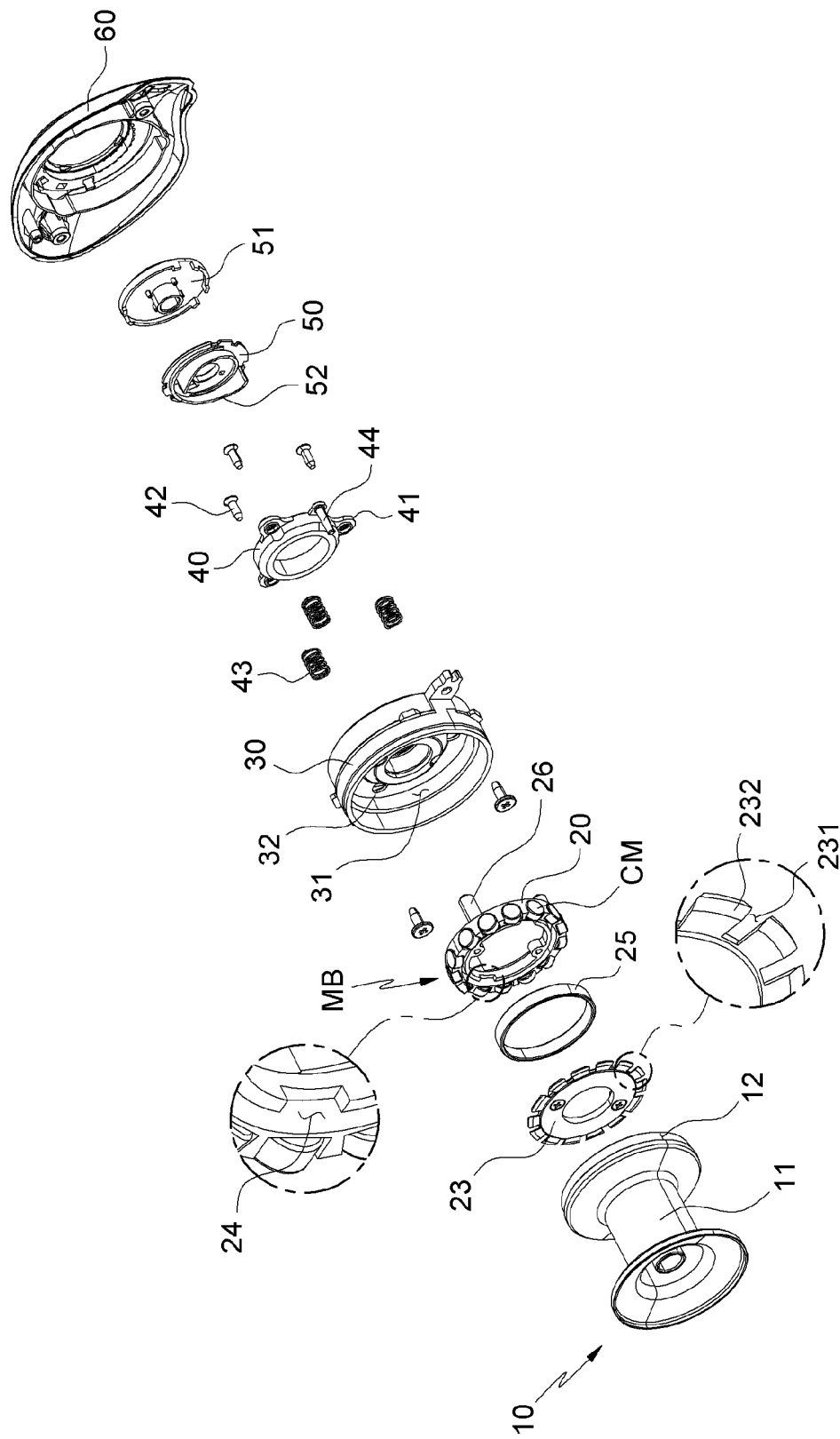
FIGS. 1A and 1B are exploded perspective views of a first embodiment according to the present disclosure.
Figure 1B:
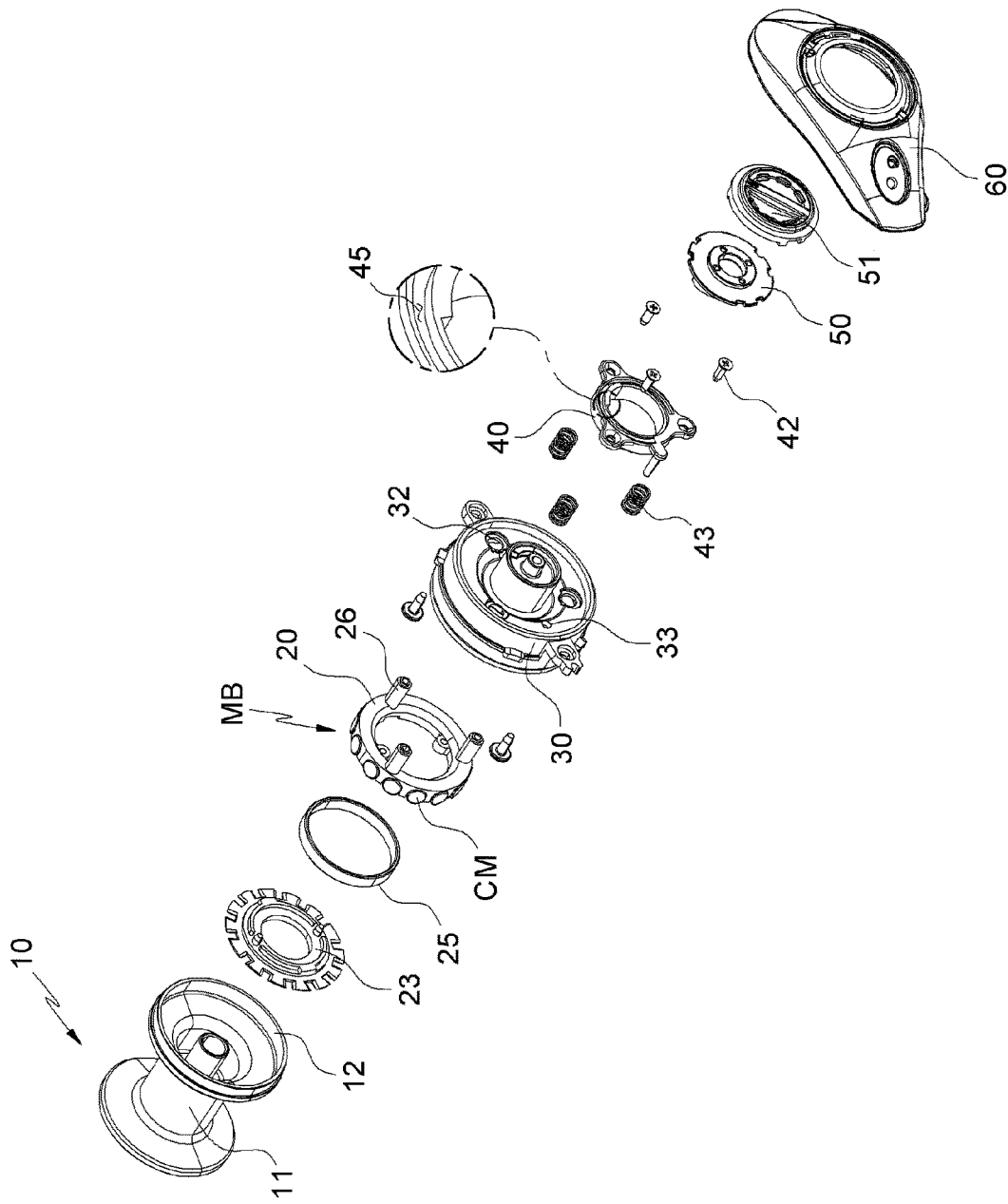

The present disclosure may be modified in various ways and implemented by various exemplary embodiments, so that aspects (or embodiments) will be described in detail. However, it is to be understood that the present disclosure is not limited to the specific exemplary embodiments, but includes all modifications, equivalents, and substitutions included in the spirit and the scope of the present disclosure.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood on the basis of this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present disclosure should not be interpreted narrowly.

The terminology used herein is for the purpose of describing particular aspects (or embodiments) only and is not intended to be limiting of the present disclosure. Singular forms are intended to include plural forms unless the context clearly indicates otherwise.

It will be further understood that the terms "comprises" or 'composed of' used in this specification, specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms has the same meaning as those that are understood by those who skilled in the art. It will be further understood that terms such as terms defined in common dictionaries should be interpreted as having a meaning that is consistent with their meaning in the context of this specification and the relevant art and will not be interpreted in an idealized or overly formal sense unless expressly so defined herein.

Terms such as "a first—" and "a second—" are used only for the purpose for distinguishing a constitutive element from other constitutive element, but constitutive element should not be limited to a manufacturing order, and the terms described in the detailed description of the present disclosure may not be consistent with those described in the claims.

For convenience of the description of a fishing reel according to the present disclosure, when an approximate direction rather than a precise direction is specified with reference to FIG. 1A, a lower side is determined based on a direction to which gravity is applied, and up and down directions and right and left directions are determined based on the lower side. This standard may be also applied to the other drawings, and directions may be specified and described based on this standard unless the detailed description of the invention and the claims specially indicate otherwise.

Hereafter, a fishing reel according to the present disclosure is described with reference to the accompanying drawings.

As shown in FIGS. 1A to 4, the present disclosure relates to a fishing reel including a frame (not shown) having a spool mount of which one outer side is open, a spool 10 mounted in the spool mount, and a magnet brake MB generating a braking force by applying magnetism to a side of the spool 10.

Other components of the fishing reel that are not shown in the figures are well known in the art, a spool cover 30 is coupled to a palm-side side cover 60 to be detachably attached to an end of the frame. In this configuration, the palm-side side cover 60 is detachably attached in various types, and representatively, there is a detachably attaching structure in which a locking protrusion formed on the outer circumferential surface of the spool cover 30 is locked to a locking portion of the frame.

In detail, the present disclosure is characterized by including: a spool 10 having a drum 11 on which a fishing line is wound; and a magnet brake MB including a holder 20 that is disposed on a side of the spool 10 and a magnet that is mounted on the holder 20 in a circumferential direction crossing the axial direction of the spool 10 to have inner and outer facing surfaces and generates a braking force to the spool 10.

In this configuration, the inner and outer facing surfaces of the magnet mean that two surfaces having an area over a predetermined level from which large magnetism is generated face each other inside and outside.

According to magnet brakes of the related art, since a side of a magnet is exposed to the inside of a holder, the magnetism of a magnet acts in the axial direction of a spool.

However, the present disclosure is characterized in that the magnetism of the magnet acts in the diameter direction of the spool 10 that crosses the axial direction of the spool 10.

Accordingly, the spool 10 includes a facing part 12 extending in the axial direction of the spool 10 from an end of the drum 11 to face one of the inner and outer facing surfaces of the magnet and receiving the magnetism of the magnet.

Figure 2:
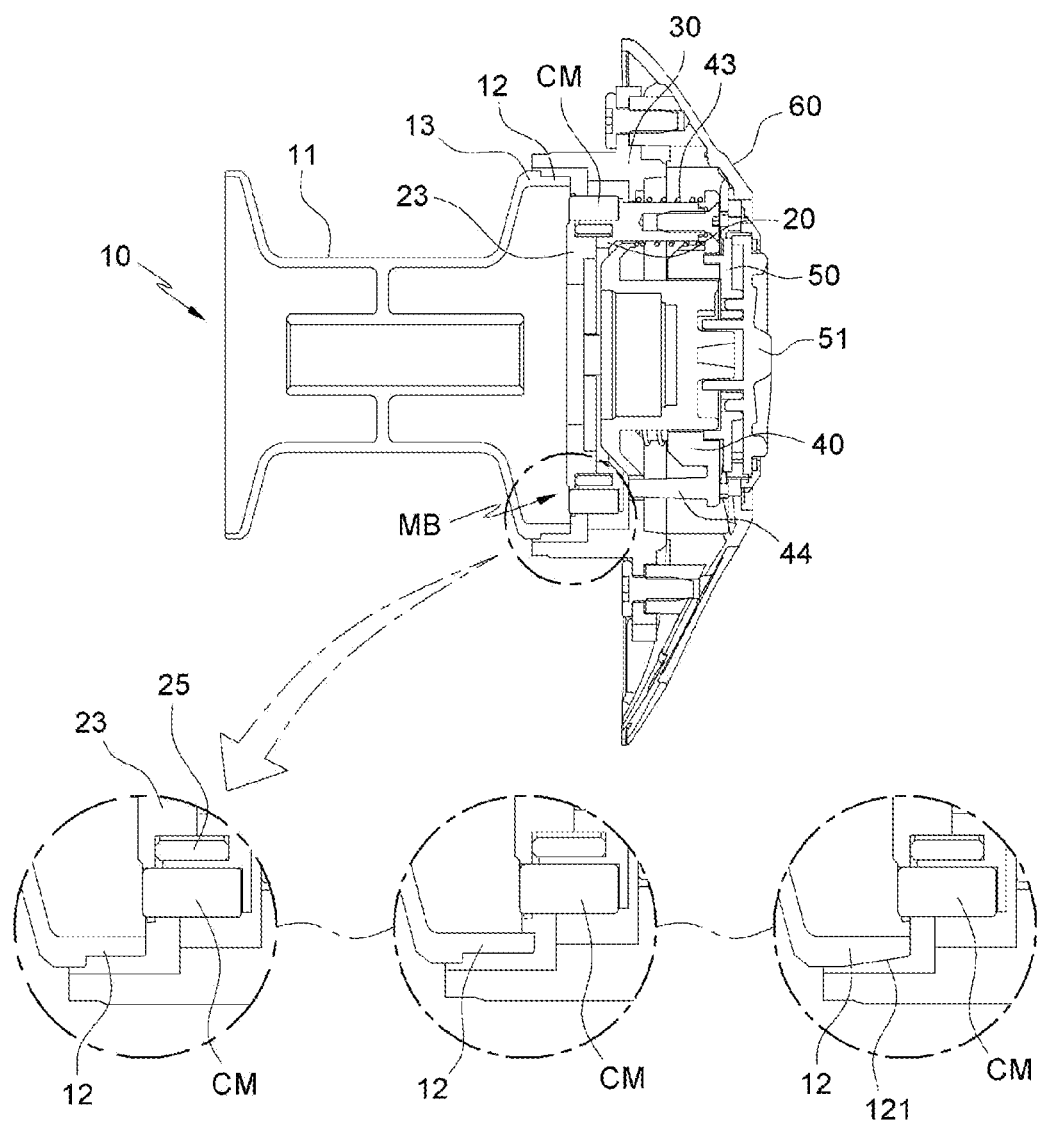
FIG. 2 is a cross-sectional view of the first embodiment according to the present disclosure.

The facing part 12 shown in the cross-sectional view in the circle at the center of the lower portion in FIG. 2 is larger in left-right width (length) (which is about 4 mm in the figure) than the facing part 12 shown in the cross-sectional view in the circle at the left of the lower portion in FIG. 2, whereby a wider magnetism generation range can be secured.

The facing part 12 shown in the cross-sectional view in the circle at the right of the lower portion in FIG. 2 has a shape in which the outer surface of the facing part 12 has an incline such that the thickness of the facing part 12 decreases toward the outer end, unlike the facing parts 12 shown in the other circles in FIG. 2, whereby it is possible to further increase the rotation speed of the spool 10 while reducing contact with the spool cover 30.

Further, a spool 10 (deep spool) having flanges that protrude at both left and right sides around the side walls, which bend at a right angle (80~90 degrees) from both ends of the drum 11 and have a gradually increasing outer diameter, is representatively shown in the figures of the present disclosure, but the present disclosure is not limited thereto (for example, the entire spool 10 may be formed in a complete cylindrical shape).

As for a deep spool, the facing part 12 is connected to one flange 13 of the spool 10, whereby the braking force of the magnet brake MB is applied.

The magnet has an outer diameter smaller than the inner diameter of the facing part 12, so magnetism acts on the inner circumferential surface of the facing part 12, which will be described with detailed embodiments of the magnet.

The holder 20 is connected to a slide cam 40 to be described below and is seated in a seat 31 on a second side (front side) of the spool cover 30.

The holder 20 includes a mount in which the magnet is fitted.

The mount depends on embodiments of the magnet.

First, as a first embodiment, as shown in FIGS. 1A to 3F, the mount is composed of a plurality of mounting grooves 21 circumferentially arranged along the outer circumferential surface of the holder 20 and the magnet is composed of a plurality of coin-shaped magnets CM fitted in the first mounting grooves 21, respectively.

The first mounting grooves 21 are each formed in a pseudo U-shape of which the second side is open such that the outer circumferential surface of the holder 20 is open, and the outer diameter of the holder 20 on which the first mounting grooves 21 are circumferentially arranged is smaller than the inner diameter of the facing part 12.

Accordingly, as will be described below, when the holder 20 is moved left and right in the axial direction of the spool 10, the coin-shaped magnets CM are inserted into the facing part 12 and the magnetism of the coin-shaped magnets CM acts on the inner circumferential surface of the facing part 12, whereby a braking force is generated.

That is, it may be possible to arrange the coin-shaped magnets CM to have an inner diameter larger than the facing part 12 such that magnetism acts on the outer circumferential surface of the facing part 12, but the size of the frame is increased in this case, so, in order to prevent this problem, the coin-shaped magnets CM are configured to generate a braking force while moving forward and backward inside the facing part 12.

In this configuration, the number, size, and mounting type of the coin-shaped magnets CM may be implemented in various ways.

Figure 3A:
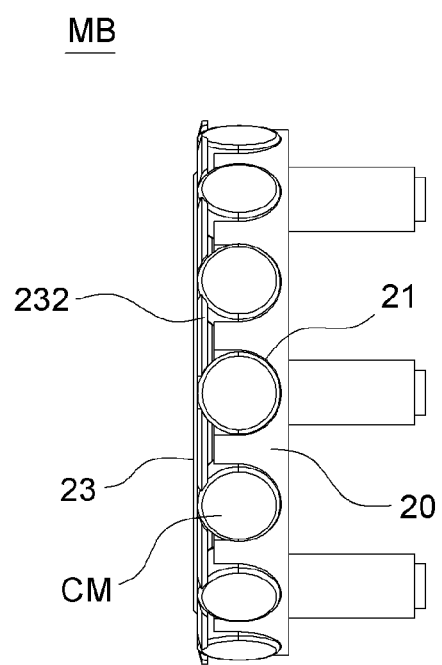
FIGS. 3A to 3F are views showing detailed modified embodiments of the first embodiment according to the present disclosure.

First, in FIG. 3A, coin-shaped magnets CM all have the same size and thickness and are mounted and arranged in a line along the outer circumferential surface of the holder 20.

Figure 3B:
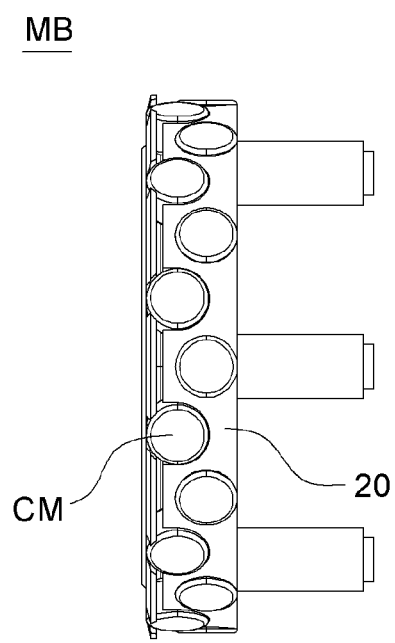
Figure 3C:
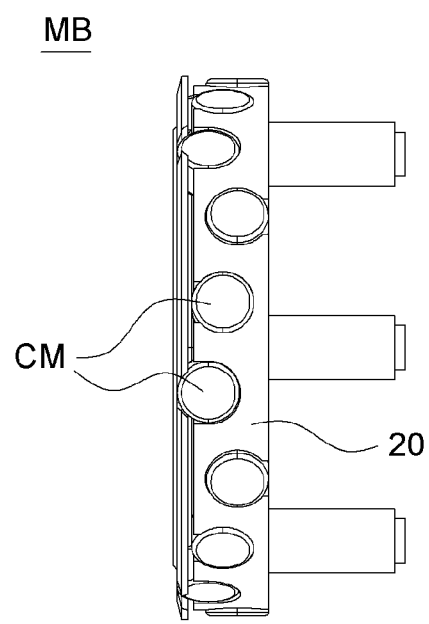

In FIGS. 3B and 3C, coin-shaped magnets CM all have the same size and thickness and are mounted and arranged in several lines (2 lines in FIG. 3B and 3 lines in FIG. 3C) along the outer circumferential surface of the holder 20. In this case, the coin-shaped magnets CM are arranged to partially overlap the coin-shaped magnets CM in other adjacent lines.

Figure 3D:
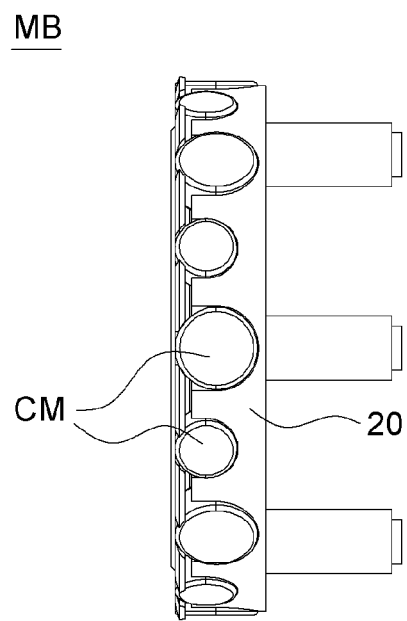

Further, in FIG. 3D, coin-shaped magnets CM all have the same thickness and different sizes and are alternately arranged along the outer circumferential surface of the holder 20.

Figure 3E:
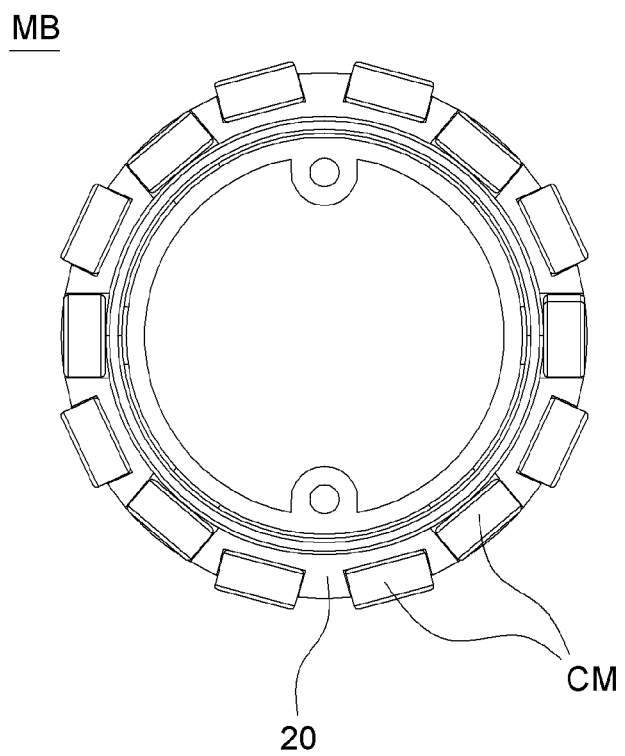

Further, in FIG. 3E, coin-shaped magnets CM all have the same thickness and size and first mounting grooves 21 having different depths are alternately arranged along the outer circumferential surface of the holder 20, so the coin-shaped magnets CM are mounted at different depths (protrude different heights from the outer circumferential surface of the holder 20).

Figure 3F:
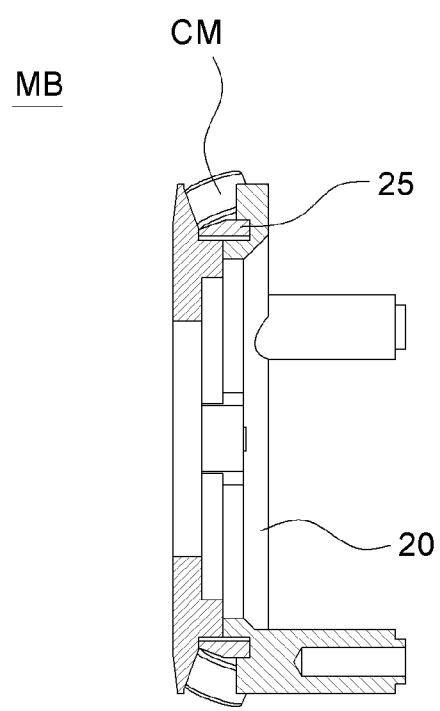

Meanwhile, in FIG. 3F, coin-shaped magnets CM are mounted to incline with respect to the axial direction of the spool 10. In this case, the coin-shaped magnets CM are mounted such that their inner ends are inclined toward the center of the holder 20, and accordingly, the inner circumferential surface of the facing part 12 is tapered to correspond to the mounting angle of the coin-shaped magnets CM.

However, coin-shaped magnets CM of the present disclosure are not limited to the features shown in FIGS. 3A to 3F, the features shown in the figures may be changed and combined in various ways, and the scope of the present disclosure should not be construed as being limited thereto.

Figure 4:
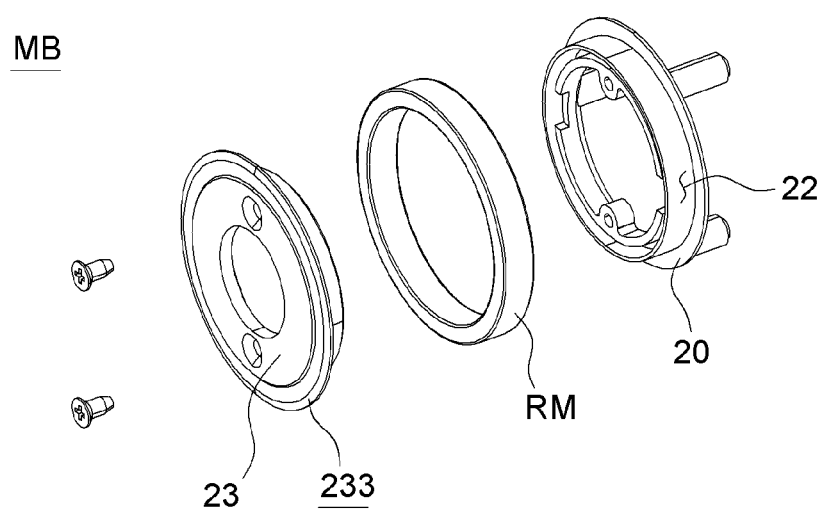
FIG. 4 is a perspective view showing main parts of a second embodiment of the present disclosure.
Figure 5A:
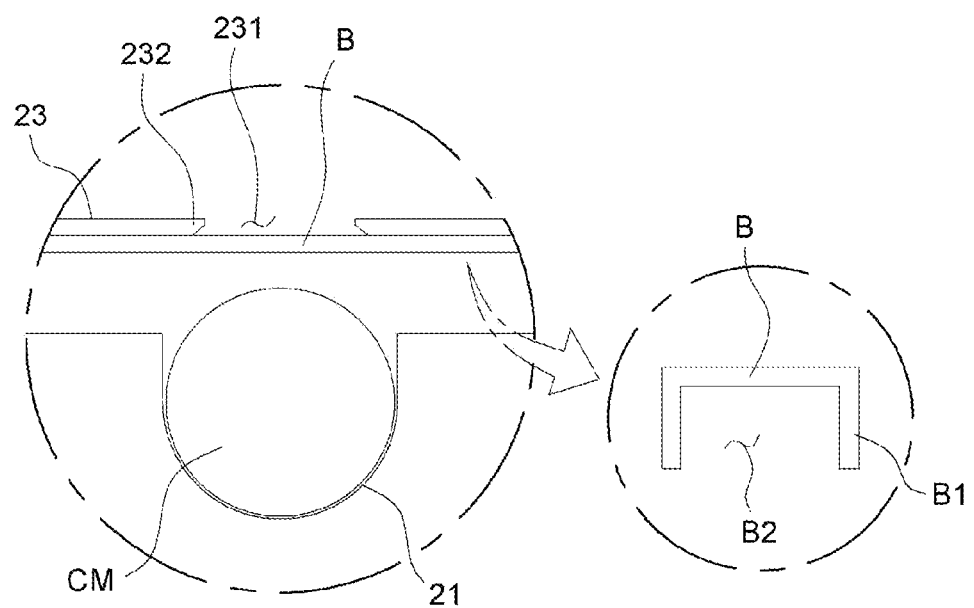
FIGS. 5A and 5B are side views showing main parts to describe an anti-separator according to the present disclosure.
Figure 5B:
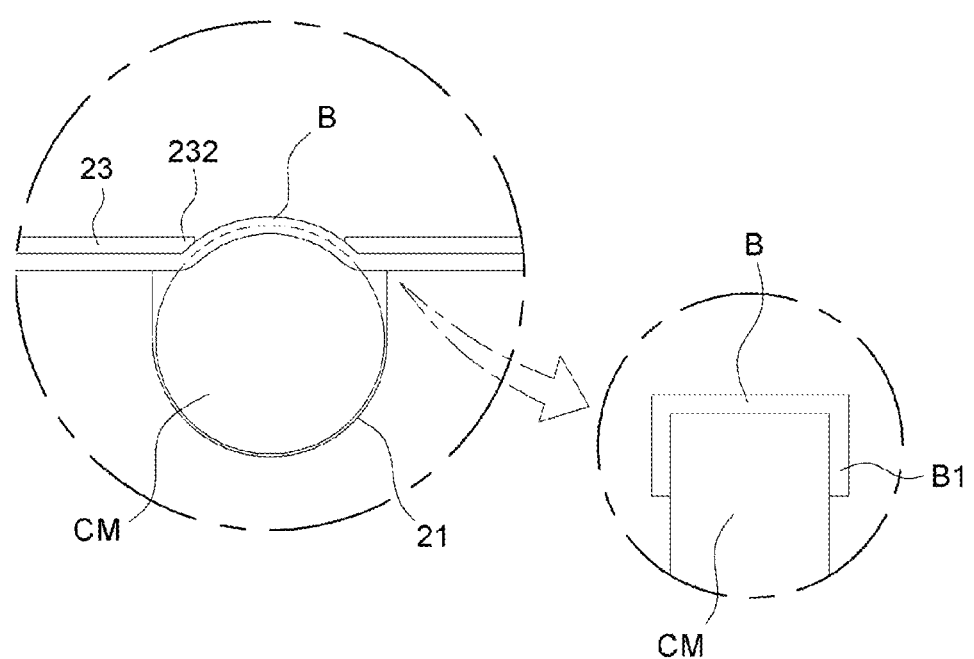

Meanwhile, as a second embodiment of the present disclosure, as shown in FIG. 4, the mounting part is a second mounting groove 22 formed in a continuous circular shape along the outer circumferential surface of the holder 20 and the magnet is a ring-shaped magnet RM fitted in the second mounting groove 22.

The ring-shaped magnet RM has inner and outer facing surfaces on the inner and outer circumferential surfaces, similar to the coin-shaped magnets CM, and magnetism generated from the outer circumferential surface of the ring-shaped magnet RM acts on the inner circumferential surface of the facing part 12.

The ring-shaped magnet RM may also be replaced by changing the width or the thickness such that a braking force can be changed.

According to the present disclosure, the holder 20 and the magnets CM and RM can be replaced by a fixing plate 23 and a fixing ring 25 to be described below in order that a user can combine the coin-shaped magnets CM in various ways or replace the ring-shaped magnet RM such that self tuning is possible, whereby a user can set the braking force of the magnet brake MB to be fitted to himself/herself.

In detail, the holder 20 includes a fixing plate 23 that covers an opening of the mount (the first mounting groove 21 or the second mounting groove 22), is detachably coupled to the holder 20, and fixes the magnets.

The fixing plate 23 has anti-separation portions formed along the edge thereof to correspond to the first mounting groove 21 or the second mounting groove 22.

Accordingly, in the first embodiment, the fixing plate 23 has accommodation grooves 231 formed by partially opening the edge to correspond to the first mounting grooves 21 and the widths of the accommodation grooves 231 are smaller than the widths of the first mounting grooves 21, whereby anti-separation portions 232 holding the outer circumferential surface of each of the coin-shaped magnets CM are formed at both sides of each of the accommodation grooves 231.

In the second embodiment, a disc-shaped fixing plate 23 corresponding to the outer diameter of the holder 20 is provided and an anti-separation portion 233 that is the edge of the fixing plate 23 holds the ring-shaped magnet RM.

The fixing plate 23 is detachably mounted on the second side (front side) of the holder 20 by bolts and covers openings at the second sides of the first mounting grooves 21 and the second mounting groove 22, thereby preventing separation of the magnets CM and RM and enabling a user to replace or detach the magnets CM and RM, if necessary, so that the tuning according to the features of the user is possible.

The holder 20 includes a fixing groove 24 formed in a circular shape inside the mount, and a fixing ring 25 fitted in the fitting groove 24 and preventing separation of the magnets CM and RM using attraction between the fixing ring 25 and the magnets CM and RM.

The fixing ring 25 is made of metal or a magnet having a different polarity from the magnets CM and RM, so attraction is generated between the fixing ring 25 and the magnets CM and RM. Accordingly, when the magnets CM and RM are attached toward the center of the holder 20 by magnetism, the magnets CM and RM are prevented from separating and coming out from the mounting grooves 21 and 22.

Meanwhile, the holder 20 can be moved forward and backward in the axial direction of the spool 10, so a braking force is controlled in accordance with variation of the facing area between the magnets and the facing part 12.

The facing area between the magnets and the facing part 12 includes not only the area that changes when the magnets CM and RM overlap the facing part while moving forward into the facing part 12, but the state in which the magnets CM and RM have fully moved and separated backward not to overlap the facing part 12.

To this end, first, the holder 20 includes a plurality of coupling protrusions 26 protruding from a side and fitted through the spool cover 30.

The coupling protrusions 26 are circumferentially arranged in the circumferential direction of the holder 20 and are coupled to the slide cam 40 to be described below by bolts 42 and compression springs 43 are fitted on the coupling protrusions 26, respectively, with first ends thereof being supported by the slide cam and second ends thereof being supported by the spool cover 30, thereby elastically supporting the holder 20 connected to the slide cam 40, that is, the magnets CM and RM away from the facing part 12.

The spool cover 30 has an open seat 31 on the second side (front side) in which the holder 20 is accommodated and has through-hole 32 through which the coupling protrusions 26 are fitted.

The spool cover 30 has a guide hole 33 formed through both sides of the spool cover 30 separately from the through-holes 32, and a guide protrusion 44 of the slide cam 40 is fitted in the guide hole 33.

The slide cam 40 is fitted on the first side of the spool cover 30 to be able to move left and right and has supporting portions 41 corresponding to the coupling protrusions 26. When bolts 42 are coupled to the coupling protrusions 26 through the supporting portions 41, the holder 20 and the slid cam 40 are operated together.

Further, the guide protrusion 44 protruding from a second side of the slide cam 40 is fitted in the guide hole 33, whereby left-right movement of the slide cam 40 is guided.

The slide cam 40 has a cam corresponding portion 45 circumferentially formed on a first side (rear side), so when a dial cam 50 to be described below is rotated, the slide cam 40 is moved left and right in the axial direction of the spool 10.

A dial part 51 is fitted to a first side of the dial cam 50 to be exposed to the outer surface of the palm-side side cover 60 and a cam part 52 protrudes from a second side thereof in surface contact with the cam corresponding portion 45.

The cam corresponding portion 45 and the cam part 52 are each formed such that a lowest point and a highest point are connected at an angle in the circumferential direction of the cams thereof, so when the lowest point and the highest point of the cam corresponding portion 45 come into surface contact with the lowest point and the highest point of the cam part 52, the slide cam 40, that is, the holder 20 is positioned as far as possible in one direction from the spool 10.

Further, when the dial cam 50 is rotated, the surface contact height between the cam corresponding portion 45 and the cam part 52 changes, so the slide cam 40, that is, the holder 20 is moved forward or backward in the axial direction of the spool 10, whereby the distance between the facing part 12 and the magnets CM and RM is adjusted.

Accordingly, a user can control a braking force that is initially generated by adjusting the distance between the facing part 12 and the holder 20 to be fitted to the features of himself/herself.

When the spool 10 that is being rotated is accelerated, an eddy current is generated between the facing part 12 and the magnets CM and RM, and attraction due to the eddy current that increases when the spool 10 is rotated at a high speed over a predetermined level exceeds the elasticity of the compression springs 43, so the holder 20 is moved forward into the facing part 12 and the overlap area between the inner circumferential surface of the facing part 12 and the outer sides of the magnets CM and RM increases, whereby large magnetism acts and a braking force correspondingly increases.

When the spool 10 is decelerated under a predetermined level by a braking force, the elasticity of the compression springs 43 moves the holder 20 backward away from the spool 10, thereby reducing the braking force.

Accordingly, the braking force of the magnet brake MB is increased or decreased to appropriate levels in accordance with the rotation speed of the spool 10, so it is possible to prevent backlash and reduction of a casting distance.

Meanwhile, the present disclosure further includes an anti-separation band B more safely fixing the coin-shaped magnets CM in cooperation with the fixing plate 23.

The anti-separation band B is made of a material having a predetermined level of elasticity and is coupled in a ring shape along the edge of a first side of the fixing plate 23 across the accommodation grooves 231.

The anti-separation band B is formed in a U-shape with an open side and has an insertion groove B2 formed between inner and outer retaining portions.

Accordingly, when the fixing plate 23 is coupled to the holder 20, second sides of the coin-shaped magnets CM in the first mounting grooves 21 are partially inserted in the insertion groove B2, and in this process, elasticity that is generated by expansion of the anti-separation band B over the accommodation grooves 231 presses the coin-shaped magnets CM into the first mounting grooves 21, thereby holding the coin-shaped magnets CM. In particular, even though the fixing plate 23 is twisted, the anti-separation band B strongly fixes the coin-shaped magnets CM. Therefore, it is possible to prevent the coin-shaped magnets CM from separating and coming out from the first mounting grooves 21, particularly, the openings at the second sides of the first mounting grooves 21.

Further, although a fishing reel was described with reference to the accompanying drawings, the present disclosure may be changed, modified, and replaced in various ways by those skilled in the art, and the change, modification, and replacement should be construed as being included in the protective range of the present disclosure.

What is claimed is:
1. A fishing reel comprising:
a spool having a drum on which a fishing line is wound, and a facing part extending in an axial direction of the spool from an end of the drum; and
a magnet brake including a holder disposed on a side of the spool and a magnet mounted on the holder in a circumferential direction of the spool to have inner and outer facing surfaces and generating a braking force to the spool,
wherein the holder has an outer dimeter smaller than an inner diameter of the facing part, and the magnet is mounted on an outer circumferential surface of the holder such that magnetism acts on an inner circumferential surface of the facing part,
the holder includes a plurality of first mounting grooves circularly arranged along the outer circumferential surface of the holder,
each of the first mounting grooves is formed in a pseudo U-shape having an opening,
the magnet includes a plurality of coin-shaped magnets fitted in the first mounting grooves, respectively, the holder comprises a fixing plate that covers the openings of the first mounting grooves, the fixing plate being detachably coupled to the holder and fixing the coin-shaped magnets, the fixing plate has accommodation grooves each formed at an edge of the fixing plate, the accommodation grooves corresponding to the first mounting grooves, respectively, and widths of the accommodation grooves are smaller than widths of the first mounting grooves, whereby anti-separation portions holding an outer circumferential surface of each of the coin-shaped magnets are formed at both sides of each of the accommodating grooves.

2. The fishing reel of claim 1, wherein the holder is configured to move forward and backward in the axial direction of the spool, so the braking force is controlled in accordance with variation of a facing area between the coin-shaped magnets and the facing part.

3. The fishing reel of claim 1, further comprising:
a spool cover having an open seat in which the holder is accommodated, and a through-hole into which a coupling protrusion of the magnetic brake is fitted;
a slide cam fitted on the spool cover to be able to move in the axial direction of the spool and coupled to the coupling protrusion, whereby the slide cam and the holder are operated together; and
a dial cam having a dial part exposed to an outer surface of a palm-side cover, and a cam part protruding towards the slide cam.

4. The fishing reel of claim 3, further comprising:
a compression spring fitted on the coupling protrusion, one end of the compression spring being supported by the slide cam and the other end of the compression spring being supported by the spool cover, thereby elastically supporting the coin-shaped magnets.

5. The fishing reel of claim 4, wherein the slide cam comprises a guide protrusion protruding to be fitted in the spool cover.

\* \* \* \* \*